United States Patent [19]

Heinzelmann

[11] Patent Number: 4,866,758
[45] Date of Patent: Sep. 12, 1989

[54] PHONE MANAGEMENT SERVER FOR USE WITH A PERSONAL COMPUTER LAN

[75] Inventor: Karl A. Heinzelmann, Aberdeen, N.J.

[73] Assignees: American Telephone and Telegraph Company, New York, N.Y.; AT&T Bell Laboratories, Murray Hill, N.J.

[21] Appl. No.: 264,654

[22] Filed: Oct. 31, 1988

[51] Int. Cl.[4] .................... H04M 11/00; H04Q 3/545
[52] U.S. Cl. ........................................ 379/94; 379/96; 379/247; 379/269
[58] Field of Search ........................ 379/94, 96, 98, 93, 379/269, 284, 247; 370/58, 60, 61, 62

[56] References Cited

PUBLICATIONS

Anonymous, *The Western Electric Engineer*, 2d Iss 1983, pp. 24a-25a.
Feiner et al., *AT&T Technical Journal*, vol. 64, No. 1, Pt. 2, pp. 145-151.
Baxter et al., *AT&T Technical Journal*, vol. 64, No. 1, Pt. 2, pp. 153-173.
Feiner, *IEEE Jrnl. on Sel. Area in Comm.*, vol. SAC-3, No. 4, Jul. 1985, pp. 522-530.
Mokhoff, *Electronic Design*, vol. 35, No. 15, Jun. 25, 1987, pp. 57, 58, 60.
Day et al., *AT&T Technology*, vol. 2, No. 3, 1987, pp. 22-29.
Cole, *Electronics*, vol. 60, No. 20, Oct. 1, 1987, pp. 77-78.
Brandt, *AT&T Technology*, vol. 3, No. 1, 1988, pp. 32-39.
AT&T brochure form PM-1703, 1986, for the PC/PBX Connection Expansion Card; pp. 1 and 2.
AT&T catalog entry for PC/PBX Connection, pp. 72, 73 (undated).
"The Architecture of Meridian SL Integrated Services Networks", A. Boleda et al., *Telesis* 1985 two (Bell Northern Res., Canada), pp. 26-33.
"ITT 5700 Business Communication System", E. Kiatipov, *Electrical Communication*, vol. 60, No. 1, 1986, pp. 10-16.

Primary Examiner—Thomas W. Brown
Attorney, Agent, or Firm—Erwin W. Pfeifle

[57] ABSTRACT

The present invention relates to a technique for providing phone management (PM) services to personal computers (PCs) which are end users of a PC-only Local Area Network (LAN) by logically associating voice terminals of a separate voice and data Network, e.g., a Private Branch Exchange (PBX), with the PCs. To provide the PM services, a PM server device is provided as an interface between the PC and PBX Networks onto which are bridged appearances of the logically associated voice terminals. The PM server device includes hardware and PM server application software that perform routing and translations between (1) PM messages of the PC-LAN which use a first PM signaling protocol, and (2) PM messages of the PBX which use a second signaling protocol. Each end user PC of the PC-LAN that is logically associated with a voice terminal on a PBX network includes PM user application software that provides a PM user interface and terminates the first PM signaling protocol. Typical PM services that can be performed at the PC are displaying calling/called party identification, retrieving and displaying messages on the PC screen, and placing voice calls from a PC-based directory.

5 Claims, 3 Drawing Sheets

PHONE MANAGEMENT SERVER FOR USE WITH A PERSONAL COMPUTER LAN

TECHNICAL FIELD

The present invention relates to method and apparatus for providing phone management functionality to personal computers (PCs) which are end users of a PC Local Area Network (LAN) by logically associating telephones that are coupled to a separate voice and data network, such as a Private Branch Exchange (PBX), with the PCs coupled to the PC-LAN.

DESCRIPTION OF THE PRIOR ART

In recent years, modern technology has been applied to improve operations in business offices by both the use of computers and the evolution of the traditional Private Branch Exchange (PBX) into an office automation system. Typical of such modern PBXs are, for example, the AT&T System 75 and System 85 Office Communication Systems which provide integrated voice and data processing between nodes and locations of business customers. Integrated voice/data services are those in which voice and data are logically related; that is, a terminal or personal computer (PC) and a telephone are linked at one location to compliment each other, producing a synergy. Typical applications would be to display the name of a caller on a PC screen or storing the call into a database; computer retrieval of information relating to a voice call; and allowing messages to be stored orally or electronically for subsequent retrieval from a variety of voice and data instruments. The System 75 and 85 PBXs are typically connected to their associated voice or data terminals by a premises distribution system that includes a combination of twisted-pair copper wires and optical fibers, and such systems allow customers to control their own communications environment. *IEEE Journal On Selected Areas of Communication*, Vol. SAC-3, No. 4, July 1985, at pages 522-530 by A. Feiner; AT&T Technology, Vol. 2, No. 3, 1987, at pages 22-29 by J. F. Day et al.; and AT&T Technical Journal, Vol. 64, No. 1, Part 2, January 1985 at pages 145-151 by A. Feiner et al., and pages 153-173 by L. A. Baxter et al.

As the popularity of desktop computers or minicomputers increases, it was found that productivity increases dramatically when computers can easily access other computers and peripheral devices. To provide such access, office communication systems such as a local area network (LAN) were developed to interconnect computers and peripheral devices. A typical LAN for providing such capability is, for example, the AT&T STARLAN network as described, for example, in the article by R. B. Brandt in AT&T Technology, Vol. 3, No. 1, 1988, at pages 32-39; and the article by N. Mokhoff in Electronic Design, Vol. 35, Iss. 15, at pages 57, 58 and 60. The STARLAN LAN provides connections among its nodes with unshielded twisted-pair wiring; and devices with standard RS-232C connectors, such as asynchronous terminals, printers, modems and other computers, are connected to the network through an RS-232C STARLAN Network Access Unit (NAU). The software provided for the STARLAN network makes possible certain kinds of networking services as, for example, (1) the ability of an associated PC to access shared directories, files, and printers on a wide range of DOS- or UNIX-system-based server computers, and (2) the ability of terminals, workstations, printers and other asynchronous RS-232C devices, connected to the network via the NAU, to interact with a network computer as if the devices were connected directly to the RS-232C port on the computer. Such network, however, does not integrate voice transmission capabilities as found with the System 75 and 85 PBXs.

The problem remaining in the prior art is to provide an existing computer-based network that transmits data with a phone management functionality at a reduced cost and without modifying the computer-based network to produce a voice and data network.

SUMMARY OF THE INVENTION

The foregoing problem in the prior art has been solved in accordance with the prsent invention which relates to method and apparatus for providing phone management functionality to personal computers (PCs) or minicomputers which are end users of a PC Local Area Network (LAN) by logically associating voice terminals that are coupled to a separate voice and data network, such as a Private Branch Exchange (PBX), with predetermined PCs coupled to the PCLAN. More particularly, the present invention permits several PC-LAN users to logically associated (1) a voice terminal associated with a PBX, and (2) a PC associated with a PC-LAN in order to provide phone management functions as, for example, (a) displaying calling/called party identification obtained from the PBX on the PC screen, (b) placing voice calls via the PBX associated voice terminal from a PC-based directory; and (c) retrieving messages from the PBX destined for the logically associated voice terminal and displaying the messages on the PC screen using a phone management server protocol.

Other and further aspects of the prsent invention will become apparent during the course of the following description and by reference to the accompanying drawings.

DETAILED DESCRIPTION

The description of the present invention which follows is directed to the technique of locally associating a telephone connected to an AT&T System 25, 75 or System 85 data and voice communication system, hereinafter referred to as a PBX network, and a personal computer (PC) or minicomputer connected to a separate AT&T STARLAN PC Local Area Network (PC-LAN) in order to provide a phone management server application. It is to be understood that the use of the system 25, 75 or 85 and the STARLAN networks is merely for purposes of explanation and not for purposes of limitation and that other suitable PC-LANs or data/voice networks or systems could be substituted and still fall within the spirit and scope of the present invention. Such other data/voice network or system might include the well-known Integrated Services Digital Network (ISDN) switch.

Figure 1:
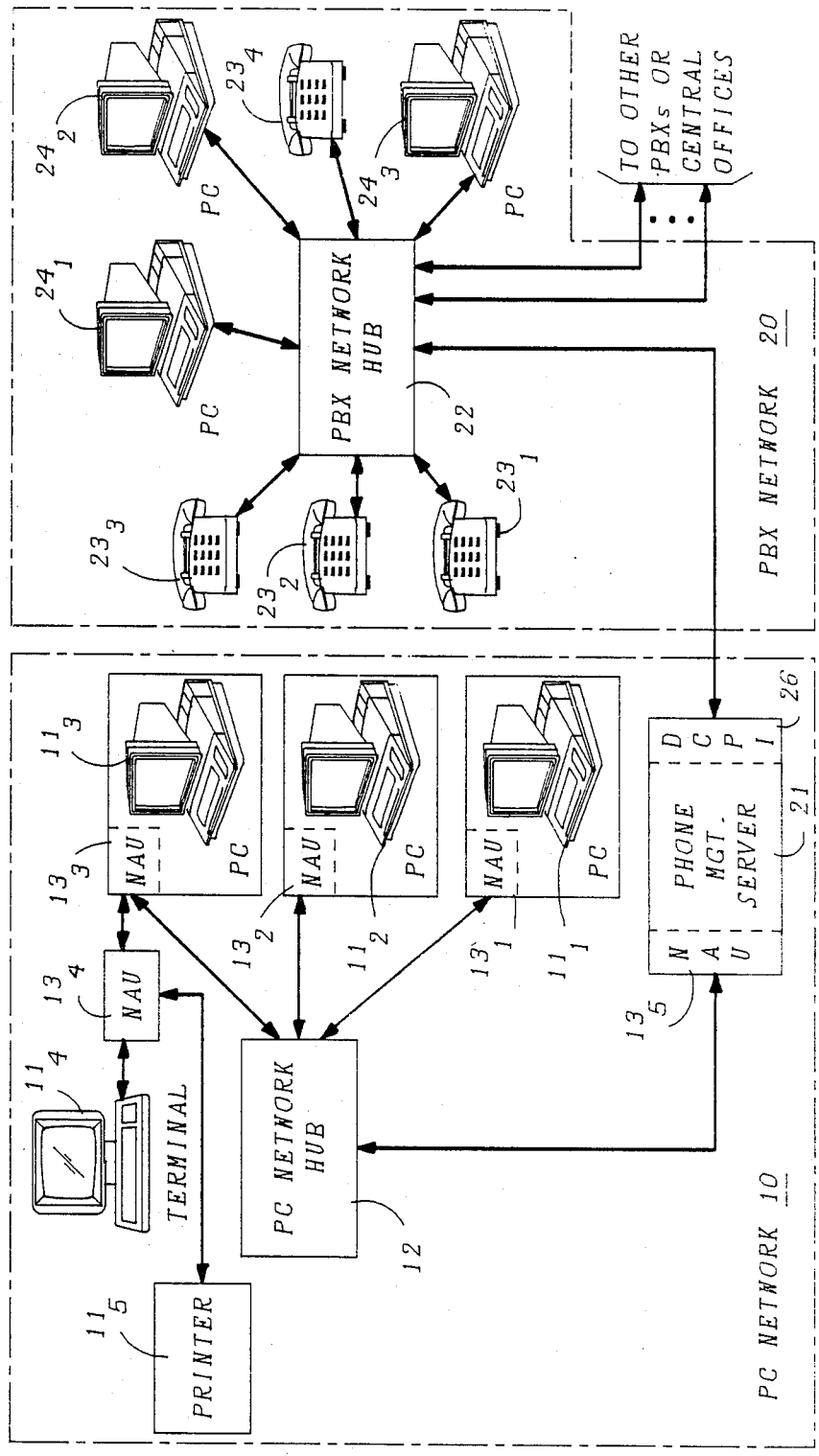
FIG. 1 is a block diagram of an exemplary PC-based network and an exemplary PBX-based network that are arranged to provide phone management functionality to the PC-based network in accordance with the present invention.

FIG. 1 is a block diagram of a well-known STAR-LAN PC-based network 10 and a well-known PBX network 20 which are connected by a phone management server device 21 to provide phone management functionality to network 10 in acordance with the present invention. Phone management server device 21 is shown in FIG. 1 as part of PC-based system 10, but it should be understood that connection 21 could form part of the PBX system 20. The exemplary AT&T STARLAN LAN 10 is a low-cost development of the IEEE 802.3 Carrier Sense Multiple Access/Collision Detection (CSMA/CD) standard network protocol for use over telephone twisted pairs. As shown in FIG. 1, the exemplary STARLAN LAN 10 includes a plurality of N peripheral devices 11 such as PCs $11_1$ to $11_3$, a terminal $11_4$ and a printer $11_5$ for the exemplary case where N=5 and a hub 12. As shown in FIG. 1, PCs $11_1$ to $11_3$ are connected to hub 12 via Network Access Units (NAUs) $13_1$ to $13_3$, respectively, and terminal $11_4$ and printer $11_5$ are connected in a daisy-chain configuration from PC $11_3$ through an NAU $11_4$. The PCs, terminals and printers 11 are coupled to a hub 12 to provide a star network in a manner described extensively in the article by R. B. Brandt in *AT&T Technology*, Vol. 3, No. 1, 1988, at pages 32–39.

The STARLAN LAN has three fundamental components: Network Access Units (NAUs), Network Extension Units (NEUs) and Network Repeater Units (NRUs). The NAU is the basic building block and acts as an interface which enables a computer, such as a PC or minicomputer, or other device, such as a modem, a printer or asynchronous terminal, to send or receive data over the PC network. There are two types of NAUs; one for a computer which is a plug-in expansion card that is installed in a slot for each computer such as NAUs $13_1$ to $13_3$, and one for RS-232C devices that is a stand-alone component that can support two devices such as NAU $13_4$. The NEU (not shown) is generally found in hub 12 and is the component used by itself or with other NEUs in a tree arrangement, depending on the size of the network, to form the star network as shown in the above-cited Brandt article. Each NEU connects a predetermined plurality of any combination of NAUs and/or other NEUs and their NAUs to its plural ports and receives network signals from these devices, regenerates these signals and returns them to the connected devices. If two or more NAUs 11 transmit data at the same time, the NEU sends a collision-presence signals that causes the associated NAUs to stop transmitting, wait, and then retransmit their data. The NRU (not shown) is also generally found in the hub 12 and is used to connect nodes separated by a long distance to a port on one of the NEUs by receiving network signals, then retiming and regenerating the signals to remove noise. The standard STARLAN networking software for the STARLAN LAN is provided in each of the user PCs $11_1$ to $11_3$ via their NAUs $13_1$ to $13_3$ and in the daisy-chained NAUs as in NAU $13_4$. Such program allows the user device(s) to be part of the STARLAN network.

The well-known PBX network 20 includes a hub 22 for processing and directing voice and data transmissions between the various associated plurality of N end user voice devices $23_1$ to $23_4$ (where N=4), such as telephones, and plurality of M end user data devices such as PCs $24_1$ to $24_3$ (where M=3). Other PBX networks or central offices can also be connected to hub 22 via trunks 25 for routing information transmissions originating and terminating within PBX network 20 to and from, respectively, such other networks and offices when required. As shown for the System 75 communication and control architecture in FIG. 1 at page 154 of the article by L.A. Baxter et al. in *AT&T Technical Journal*, Vol. 64, No. 1, January 1985, pages 153–173, the exemplary System 75 includes, within a hub 22, Time Division Multiple (TDM) buses to which are connected to the (1) lines coupling the system associated devices 23 and 24, (2) trunks 25 to other PBXs and Central Offices, and (3) service circuits required for the system. A control complex is generally included within hub 22, which is also connected to the TDMA buses, including the necessary processors, memories, controllers and maintenance circuits, and the necessary software for providing the network control, to monitor and control system communications such as call processing. Such architecture would be a typical arrangement of an Office Communication System which can be used for PBX network 20. The AT&T System 75, and the larger AT&T System 85, provide integrated data switching, including 64-kb/s transparent switching; and simultaneous voice/data transmission using a Digital Communications Protocol (DCP) that support two 64-kb/s voice and data channels and one 8-kb/s signaling channel at a single interface. Standard system and terminal features for System 75 are listed at pages 147–149 in the article by A. Feiner et al. in *AT&T Technical Journal*, Vol. 64, No. 1, January 1985 at pages 145–151 and include features such as direct inward and outward dialing, multiple call appearances of extensions, bridged calls, called/calling party identification, message retrieval, etc. The buses, service circuits and control complex are not shown in present FIG. 1, or described further hereinafter, to simplify the description of the present invention, but are included for all overall understanding of such PBX network, and further information thereon can be obtained from the above-mentioned Baxter et al. article.

In accordance with the present invention, phone management functionality is povided to desired PCs on PC network 10 by logically associating certain voice terminals 23 associated with PBX network 20 with desired PCs 11 associated with PC network 10. For purposes of discussion hereinafter, it will be assumed that voice terminals $23_1$ to $23_3$ of PBX network 20 are to be logically associated with PCs $11_1$ to $11_3$, respectively, of PC network 10. To perform such logical association of voice terminals and PCs, phone management server device 21 is disposed as an interface between PC Network 10 and PBX Network 20 to provide phone management server functionality to desired PCs $11_1$ to $11_3$ of PC network 10. Phone management server device 21 is a PC including (1) an NAU $13_5$ which interfaces with PC network 10 and permits phone management server device 21 to communicate with the PCs 11 of PC Network 10 using a STARLAN phone management (PM) signaling protocol, (2) a Ditigal Communications Protocol interface (DCPI) 26 which (a) is an existing hardware and software product that only uses the hardware thereof and runs a phone management server application program, and (b) permits phone management server device 21 to communicate with PBX Network 20 using DCP, and (3) internal interface hardware and software which provides the translation in either direction between the protocol of the NAU $13_5$ messages and the protocol of the DCPI 26 messages so that transmissions can be provided between the PCs of Network 10 and Hub 22 of Network 20.

Phone management server device 21, with NAU $13_5$ and DCPI 26, is a shared PC Network 10 resource running an application that communicates with a PBX Network 20 call control program using standard protocol messages recognized for phone management functions in the PBX Network 20, and communicates with the PC Network 10 end users using a software protocol that provides the phone management server functions to the PCs. The end user PCs $11_1$ to $11_3$ logically associated with voice terminals $23_1$ to $23_3$, respectively, on PBX Network 20, each include a phone management application program associated with the included NAU $13_i$ which terminates the phone management server protocol and provides the end user with access to the phone management functions. More particularly, the phone management server protocol defines a generic command set for access to phone management server functions.

Figure 2:
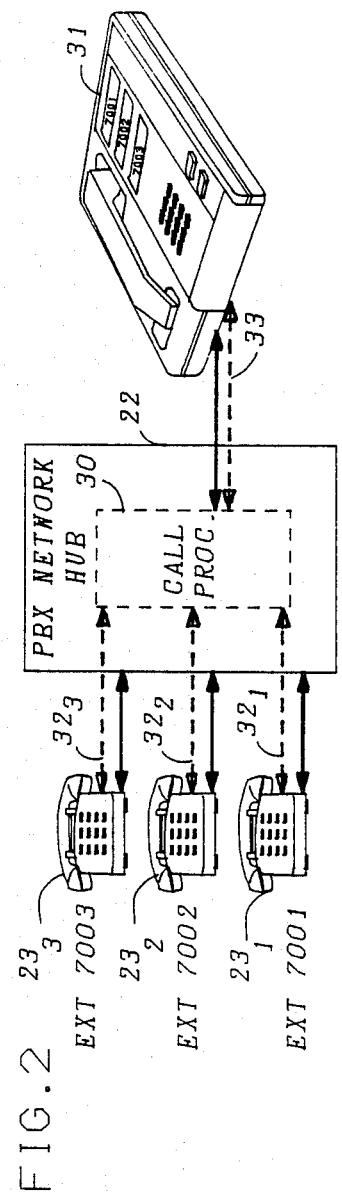
FIG. 2 is a block diagram showing bridged appearances of three voice terminals to another voice terminal.

To provide PC Network 10 end users 11 phone management functions, the end user PCs 11 of PC Network 10 and the administration software in hub 22 of PBX Network 20 need to perform in the following manner. First, the PBX Network 20 is administered so that all call appearances of voice terminals $23_1$ to $23_3$ are bridged to the station corresponding to phone management server device 21 which provides the phone management server function for PC Network 10. Known PBX Networks usually support a predetermined amount of bridged call appearances to a single station or terminal, where any call to the single station or terminal concurrently appears at all other stations or terminals which are bridged to the single station or terminal and requests from any one of the bridged appearances are processed in the same manner. To illustrate bridged appearances within a PBX Network, FIG. 2 shows how exemplary voice terminals $23_1$ to $23_3$, assumed to correspond to Extension Nos. 7001-7003, respectively, can each have a separate bridged appearance on an exemplary secondary voice terminal 31. These bridged appearances are defined in call processing software 30 in PBX hub 22 and associated one appearance on two or more voice terminals and might be found with an executive and secretary arrangement. The association of the two or more voice terminals is logical and PBX hub 22 treats them equally. In other words, both voice terminals ring simultaneously when a call is destined for a particular extension, and either voice terminal can place a call, answer a call, and retrieve a stored message or display a calling party identification if both voice terminals are capable thereof. The fundamental element is how the PBX call processing software 30 signals the voice terminals. With, for example, two DCP voice terminals with a common bridged appearance such as exemplary voice terminals $23_1$ and voice terminal 31, corresponding to Extension 7001, the PBX call processing software in hub 22 signals both voice terminals with the same signaling message over DCP signaling channels $32_1$ and 33. In a similar manner, call processing for the bridged appearances of voice terminals $23_2$ /31, for Extension 7002, and $23_3$ /31, for Extension 7003, is accomplished over signaling channels $32_2$ /33 and $32_3$ /33, respectively. The signaling messages that propagate between the DCP voice terminals 23 and PBX hub 22 are collectively termed the DCP signaling protocol. In an Integrated Services Digital Network (ISDN), such signaling protocol would be the CCITT-defined Q.931 protocol.

Figure 3:
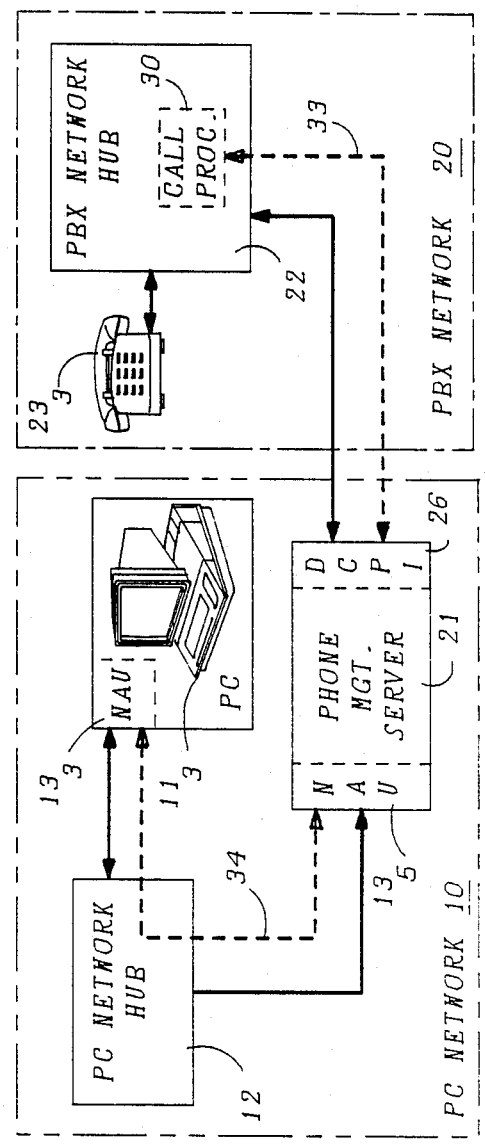
FIG. 3 is a block diagram of the present phone management server interconnections in accordance with a preferred embodiment of the present invention.

Extending the Bridged appearance concept to phone management server 21 of FIG. 1 is shown in FIG. 3 where voice terminal $23_3$ on PBX Network 20 has its bridged appearance on phone management server 21 and is logically associated with PC $11_3$ on PC Network 10. PC $11_3$ via NAU $13_3$ runs phone management user application software that provides the user interface to achieve the appropriate screen format for phone management information to be displayed, and terminates a phone management application protocol that also terminates in phone management server 21 via NAU $13_5$. Signaling between PC $11_3$ and phone management server device 21 is accomplished via PC Hub 12 and signaling channel 34 using a PC Network phone management protocol which functions similar to the the DCP signaling protocol of PBX network 20. Phone management server device 21 includes phone management server application software that performs both the routing and the PBX Network DCP signaling message to PC Network phone management message translations and vice versa.

Figure 4:
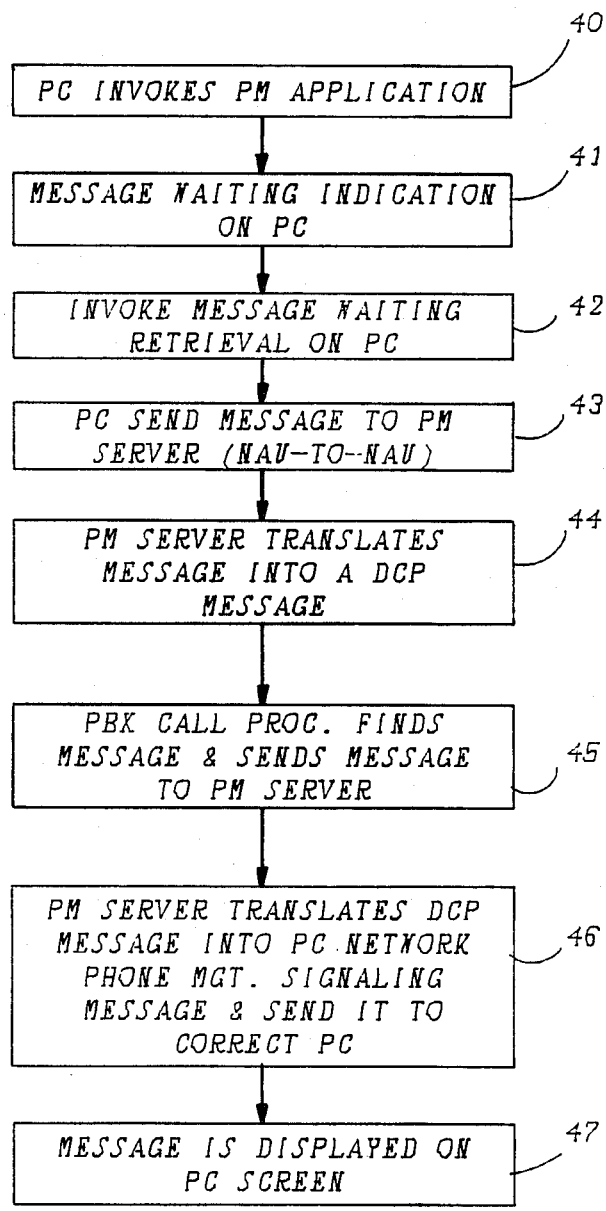
FIG. 4 is a block diagram of an exemplary process of retrieving messages on a PC of the PC-based network that is logically associated with a voice terminal on a PBX network in accordance with a preferred embodiment of the present invention.

FIG. 4 illustrates the exemplary functional steps, for the arrangement of FIG. 3, of the retrieval on PC $11_3$ of PC Network 10 of one or more messages previously stored by the call processing application software 30 in PBX Hub 22 for the logically associated voice terminal $23_3$ of PBX Network 20. Such steps also illustrate the functionality and interaction of the PC phone management user application software, the phone management server application software, and the call processing application software in PBX Hub 22. In the first step shown in block 40, a user on PC $11_3$ invokes the phone management user application software and obtains a PC screen display that includes a "message waiting" indication and shown in block 41. The user then invokes the message retrieval command associated with the phone management user application software on PC $11_3$ as shown in block 42. In response to such command, the phone management user software in PC $11_3$ generates and sends the command message for instituting message retrieval to the phone management server application software in phone management server device 21 via NAU $13_3$, signaling channel 34 and NAU $13_5$ using the PC Network phone management protocol as shown in block 43 of FIG. 4. Essentially this command message specifies that "PC user $11_3$, at PC Network address XXXXX, wants to retrieve a PBX message".

The phone management server application software accepts and translates the received PC Network 10 phone management protocol message into a corresponding DCP protocol message as shown in block 44 of FIG. 4. Essentially the DCP protocol message specifies that "Extension 7003 wants to retrieve a PBX message" and sends it via signaling channel 33 to the PBX call processing application software 30. PBX call processing application software locates the phone message for extension 7003 and sends it to all bridged appearances (voice terminal $23_3$ and phone management server device 21) as shown in block 45 of FIG. 4. If voice terminal $23_3$ is an analog terminal rather than a digital terminal that accepts the DCP signal, the PBX hub 22 will only send it to phone management server device 21. Phone management server device accepts the message and performs the proper DCP signaling message to PC Network phone management signaling message translation and routes such translated message to the correct PC Network PC, PC 11₃ as shown in block 46 of FIG. 4. The PC phone management user application software accepts the message from server device 21 and displays the message on the screen of PC 11₃ as shown in block 47 of FIG. 4.

It is to be understood that other phone management functions found with PBX Network 20 can also be performed with the present phone management server application, such as placing voice calls on voice terminal 23₃ from a directory on PC 11₃, and displaying calling/called party identification on the screen of PC 11₃ using a similar procedural sequence as shown in FIG. 4. For example, to place a voice call from a directory, blocks 40 and 43-44 of FIG. 4 would remain the same; blocks 41-42 would instead invoke the directory of numbers store in the PC phone management user memory and invoke a particular selection therefrom; and block 45 would state that the PBX call processing application software generates and sends the appropriate call message to either the called extension or over a trunk 25 to a remote PBX or central office to complete the call. Blocks 46 and 47 could also include the steps of transmitting the called/calling party identification information back to the PC for display on the screen of the PC. It is to be further understood that the PBX and PC Network phone management protocols to be used are dependent on, and should be compatible with, the protocols used by the particular PBX and PC Networks 10 and 20 which are to be used and include the voice terminals and PCs to be logically associated.

What is claimed is:

1. A method of providing phone management functionality to a personal computer (PC) or minicomputer forming part of a PC network, the method comprising the steps of:
   (a) bridging an appearance of a voice terminal disposed near the PC and forming part of a separate network to a first port of a phone management interface interconnecting the PC network and the separate network, the separate network including call processing means for handling bidirectional call processing signaling messages associated with the voice terminal and the phone management interface;
   (b) bidirectionally transmitting call processing signaling messages that are associated with the voice terminal between the call processing means of the separate network and the first port of the phone management interface using a first phone management protocol;
   (c) bidirectionally transmitting call processing signaling messages between the PC, of the PC network, and a second port of the phone management interface using a second phone management protocol; and
   (d) translating the call processing signaling messages received at either one of the first and second ports of the phone management interface between the first and second phone management protocols, and routing the translated call processing signaling messages from the phone management interface to the destined call processing means of the separate network or the PC of the PC network.

2. The method of providing phone management functionality according to claim 1 wherein in requesting phone management information from the PC of the PC network, performing step (c) by including the steps of:
   (c1) invoking phone management user application software at the PC for obtaining a predetermined display on a screen of a display device of the PC relating to phone management functions;
   (c2) generating a predetermined first phone management signaling message including a unique address designated for the PC and an indication of the request for a predetermined phone management function;
   (c3) sending the first phone management signaling message formed in step (c2) in a first direction to the second port of the phone management interface using the second phone management protocol; and
   (c4) after performing steps (d) and (b) for the predetermined first phone management signaling message in the first direction of transmission, performing steps (c) and (d) again for any second call processing signaling message sent in a second opposite direction to the first port of the phone management interface by the call processing means in response to the reception of the first phone management signaling message, and interpreting the second predetermined phone management signaling message and displaying an appropriate indication on the screen of the PC.

3. Apparatus for providing phone management functionality to a personal computer or minicomputer (PC) forming part of a first network including only PCs, the apparatus comprising:
   a second network which is separate from the PC network and is capable of providing phone management call processing functions to associated end users, the second network including
   a plurality of voice terminals, where one of the voice terminals is disposed near the PC of the first network being provided with the phone management functionality,
   call processing means which is connected to the plurality of voice terminals for handling bidirectional call processing signaling messages associated with the voice terminals; and
   a phone management server interface interconnecting the first and second networks, the phone management server interface comprising,
   a first port to which is bridged an appearance of the one voice terminal from the second network for both receiving call processing signaling messages from the call processing means and transmitting call processing signaling messages to the call processing means using a first phone management signaling protocol;
   a second port to which the PC is connected through the PC network, the second port being arranged to both receive call processing signaling messages from the PC and transmit call processing signaling messages to the PC using a second phone management signaling protocol; and
   means (1) for translating the call processing signaling messages received at the first port in the first phone management protocol into the second phone management signaling protocol and routing the translated signaling message to the second port and then to the PC of the first network, and (2) for translating the call processing signaling messages received at the second port in the second phone management signaling protocol into the first phone management signaling protocol and routing the translated signaling message to the first port and then to the call processing means.

4. Apparatus according to claim 3 wherein the translating and routing means comprises;
- a first network access interface providing a standard interface to the first network which is capable of transmittiing and receiving signaling messages to and from the PC, respectively, using the second phone management signaling protocol;
- a second network access interface providing a standard interface to the second network which is capable of transmitting and receiving call processing signaling messages to and from the call processing means, respectively, using the first phone management signaling protocol; and
- phone management server application software which performs bidirectional translations between the first and second phone management protocols and routes the translated call processing signaling messages to the appropriate one of the PC and the call processing means.

5. Apparatus according to claim 3 or 4 wherein the PC comprises:
- a network access unit (NAU) which provides a standard interface to the first network and is capable of transmitting and receiving call processing signaling messages to and from the first network, respectively, using the second phone management signaling protocol; and
- processor means including phone management user application software which both (1) generates phone management call processing signaling messages for transmission to the second port of the phone management interface in response to a phone management function request from a user of the PC, and (2) receives phone management call process signaling messages from the second port of the phone management interface and interprets such message and displays an appropriate indication on a screen of a display device associated with the PC in response to a phone management function request from the user of the PC.

* * * * *